May 31, 1938.    J. P. SMITH, JR    2,119,364
OUTPUT POWER METER
Filed Aug. 28, 1937
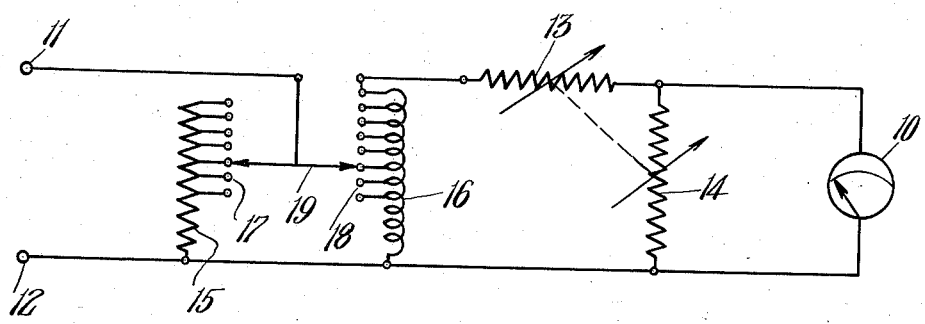
John P. Smith Jr.
INVENTOR.
BY
Kenyon & Kenyon
ATTORNEYS.

Patented May 31, 1938

2,119,364

UNITED STATES PATENT OFFICE 2,119,364

OUTPUT POWER METER

John P. Smith, Jr., Ridgewood, N. J., assignor to The Daven Company, Newark, N. J., a corporation of New Jersey Application August 28, 1937, Serial No. 161,503

3 Claims. (Cl. 171—95)

This invention relates to output power meters and has for an object a practical and inexpensive power meter which has a high degree of accuracy both for frequency and impedance characteristics.

Output power meters, although fairly new in the industry, have a widespread application. They are capable of measuring the power output of a generator source such as an amplifier or oscillator by providing a large selection of terminating impedances for such source and measuring the voltage which is developed across such termination. With the indicating meter calibrated to read in milliwatts, it is possible to use this instrument as a very rapid means of determining the power delivered by any given generator source to any desired load, of determining the impedance value of an unknown load, of determining the proper impedance value of the load for maximum transfer of energy, of determining the impedance versus frequency characteristics of the generator source and/or with the connecting transmission line, of determining the impedance versus frequency characteristics of the existing load and of determining the proper impedance value for a mismatched load when such circumstances are desirable.

Heretofore, output power meters have been based on the use of tapped transformers for the major control device. However, the use of a variable transformer as a load determination introduces a frequency error, corrections for which must be applied to the extent of 25% for readings outside of the band of 150 to 2,500 cycles. For most purposes, this frequency band is entirely too limited at the present stage of the art. Furthermore, such arrangement introduces errors in impedance measurements as great as 7% in the frequency range from 150 to 3,000 cycles and as high as 50% when the instrument is used for measurements from 20 to 10,000 cycles. In addition, a transformer of this type is expensive to manufacture, even for such limited accuracy and its cost would increase rapidly for any slight improvement in accuracy.

In an output power meter embodying the present invention, a rheostat is used as the terminating element and a variable auto transformer is used as a bridging device, means being provided for simultaneously controlling the rheostat and auto transformer. The use of a resistance terminating element eliminates considerable difficulties due to phase relations as well as the frequency and impedance errors experienced with the transformer termination. The rheostat has also the advantage of being able safely to dissipate higher energy values than a transformer without the inherent ill-effects of overloading of the transformer. Such a power output meter effects a reduction in frequency error to approximately 5% over the entire range from 20 to 10,000 cycles and a reduction in the impedance error to 5% for the same frequency range.

Other objects, novel features and advantages of this invention will become apparent from the following specification and accompanying drawing, wherein the single figure illustrates a circuit embodying the invention.

An alternating current volt meter 10 preferably of 5000 ohms impedance is connected in circuit with the terminal binding posts 11, 12 to which may be connected the generator source to be tested. A variable resistance 13 is connected in series with the meter 10 and a variable resistance 14 is connected in shunt with the resistance to form a variable L attenuator. A rheostat 15 and a variable auto transformer 16 are bridged across said L attenuator. The rheostat 15 is provided with contacts 17 and contacts 18 are tapped to the auto transformer 16. A sliding contact 19 has arms engaging the contacts 17 and 18 so that the rheostat and auto transformer are simultaneously controlled.

In operation, the rheostat 15 terminates the generator source under test and provides the desired range of terminations which in standard instruments is from 2.5 to 20,000 ohms. The bridging transformer 16 has a ten to one bridging ratio which is too high with respect to the rheostat to have any noticeable effect upon the load termination or upon the generator source. This transformer functions to step up the voltage which is developed across that portion of the rheostat used as the load. From this point on, the instrument is essentially a high impedance A. C. volt meter except that the meter and its associated controls are calibrated to read directly in milliwatts and/or decibels.

The above-described meter is of materially higher accuracy both for frequency and impedance characteristics without being any more expensive than previous power meters. The improvement in accuracy greatly increases the usefulness of the instrument as it may be used in laboratories to replace an elaborate set-up involving several instruments to obtain the same function.

I claim:

1. A device of the character described comprising a rheostat and an auto transformer in parallel, an L attenuator including a volt meter connected across the terminals of said auto transformer, and means for simultaneously controlling said rheostat and said auto transformer.

2. A device of the character described comprising a rheostat and a variable auto transformer in parallel, a volt meter connected across the terminals of said auto transformer, and variable resistances in series with and in shunt to said volt meter.

3. A device of the character described comprising a rheostat and a variable auto transformer in parallel, a volt meter connected across the terminals of said auto transformer, variable resistances in series with and in shunt to said volt meter, and means for simultaneously controlling said rheostat and said auto transformer.

JOHN P. SMITH, Jr.